United States Patent
Wang et al.

(10) Patent No.: US 11,830,990 B2
(45) Date of Patent: Nov. 28, 2023

(54) TWO-LEVEL METHOD FOR THERMAL RUNAWAY DETECTION

(71) Applicant: GM GLOBAL TECHNOLOGY OPERATIONS LLC, Detroit, MI (US)

(72) Inventors: Fang Wang, Troy, MI (US); Fiona E. Meyer-Teruel, Detroit, MI (US); Tao Wang, Oakland Township, MI (US); Thomas Timpf, Jr., Royal Oak, MI (US); Andrew C. Baughman, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 678 days.

(21) Appl. No.: 16/773,558

(22) Filed: Jan. 27, 2020

(65) Prior Publication Data

US 2021/0234209 A1 Jul. 29, 2021

(51) Int. Cl.
*H01M 10/48* (2006.01)
*H02J 7/00* (2006.01)
(Continued)

(52) U.S. Cl.
CPC .......... *H01M 10/486* (2013.01); *B60L 50/64* (2019.02); *B60L 58/24* (2019.02); *G01K 1/026* (2013.01);
(Continued)

(58) Field of Classification Search
CPC ....... H01M 10/486; H01M 2010/4278; H01M 2220/20; H01M 2010/4271;
(Continued)

(56) References Cited

U.S. PATENT DOCUMENTS

| 10,411,306 B2 | 9/2019 | Kim et al. |
| 2007/0046261 A1* | 3/2007 | Porebski ............ G01R 31/3648 320/132 |

(Continued)

FOREIGN PATENT DOCUMENTS

| CN | 106571662 A | * | 4/2017 | .............. B60L 53/00 |
| CN | 110154835 A | * | 8/2019 | |
| DE | 102019215812 A1 | * | 11/2019 | |

OTHER PUBLICATIONS

English machine translation of Huang (CN 106571662 A) (Year: 2017).*

(Continued)

*Primary Examiner* — Stewart A Fraser
(74) *Attorney, Agent, or Firm* — Quinn IP Law

(57) ABSTRACT

A battery system includes a rechargeable energy storage system (RESS) having battery cells, and a battery controller network configured to execute two-level logic to detect a thermal runaway condition. The network includes RESS-embedded cell monitoring units (CMUs) electrically connected to a respective cell group, and measuring and wirelessly transmitting cell data. A battery control module (BCM) is in communication with the CMUs. Thermal runaway sensors are mounted on the CMUs and/or the BCM. A master controller connected to the BCM includes a thermal runaway detection algorithm configured to detect a thermal runaway condition occurring within the RESS. The BCM uses data from the CMUs and thermal runaway sensors to execute first logic level which determines when to wake up the master controller. The master controller, in response to receipt of a wakeup signal, executes a second logic level to execute the algorithm.

19 Claims, 4 Drawing Sheets

(51) Int. Cl.
*G01K 1/02* (2021.01)
*G01K 13/00* (2021.01)
*B60L 50/64* (2019.01)
*B60L 58/24* (2019.01)
*H02P 27/06* (2006.01)
*H01M 10/42* (2006.01)
*B60K 6/28* (2007.10)
*B60K 6/26* (2007.10)

(52) U.S. Cl.
CPC ........ *G01K 13/00* (2013.01); *H01M 10/4257* (2013.01); *H02J 7/0013* (2013.01); *H02J 7/00032* (2020.01); *H02J 7/0047* (2013.01); *H02P 27/06* (2013.01); *B60K 6/26* (2013.01); *B60K 6/28* (2013.01); *B60Y 2200/91* (2013.01); *B60Y 2200/92* (2013.01); *H01M 2010/4271* (2013.01); *H01M 2010/4278* (2013.01); *H01M 2220/20* (2013.01)

(58) Field of Classification Search
CPC .... H01M 10/4257; B60L 50/64; B60L 58/24; H02J 7/00032; G01K 1/026; G01K 13/00; G01K 7/0013; G01K 7/0047; H02P 27/06; B60K 6/26; B60K 6/28; B60Y 2200/91; B60Y 2200/92
See application file for complete search history.

(56) References Cited

U.S. PATENT DOCUMENTS

| 2010/0085010 | A1* | 4/2010 | Suzuki ............... B25F 5/00 320/132 |
| 2010/0264878 | A1* | 10/2010 | Ueda ............... H02J 7/0016 320/116 |
| 2017/0125784 | A1* | 5/2017 | Dulle ............... B60L 50/66 |
| 2017/0300439 | A1* | 10/2017 | Paryani ............... B60L 3/0092 |
| 2019/0229376 | A1* | 7/2019 | Petrakivskyi ............ H04Q 9/00 |

OTHER PUBLICATIONS

English machine translation of Li et al. (CN 110154835 A) (Year: 2019).*
English machine translation of Dietrich et al. (DE 102019215812 A1) (Year: 2019).*
Koch, Birke, Kuhn; Fast Thermal Runaway Detection for Lithium-Ion Cells in Large Scale Traction Batteries; Botteries 2018, 4, 16; doi: 10.3390/batteries4020016; www.mdpi.com/journal/batteries.

* cited by examiner

US 11,830,990 B2

TWO-LEVEL METHOD FOR THERMAL RUNAWAY DETECTION

INTRODUCTION

The present disclosure generally relates to ongoing performance monitoring and control logic for use with a multi-cell electrochemical battery system having integrated or embedded cell sense circuits. In particular, the disclosed solutions provide an improved methodology and controller network that work together to facilitate detection and handling of a thermal runaway condition in such a battery system.

As will be appreciated by those of ordinary skill in the art, lithium-ion battery packs and battery packs constructed using battery cells having other high-energy cell chemistries are used as power supplies in an array of electrical and electromechanical systems. For example, a battery voltage supplied by a propulsion battery pack aboard a hybrid or battery electric vehicle is fed to phase-specific legs of semiconductor switches arranged within a power inverter. Control of the switching states of the semiconductor switches is used to electrically energize individual phase windings of one or more polyphase rotary electric machines. As used herein, the term "rotary electric machine" broadly encompasses electric motors, electric generators, and combined motor-generator units of the types having a stationary member/stator and a coaxially-arranged rotatable member/rotor.

When the rotary electric machine is configured as an electric motor in particular, the coordinated interaction of respective stator and rotor magnetic fields imparts rotation and torque to the rotor and a connected rotor shaft. The rotor shaft may be coupled to a driven load, e.g., via an intervening gear box or power transmission assembly, with output torque from the electric motor directed to the driven load to perform work. Opposing power flow may be used to generate electricity when mechanical rotation of the rotor with respect to the stator, with the rotation of the rotor generating current within the stator windings. The generated current is thereafter stored in the individual battery cells of the battery pack.

In an electric powertrain employing the above-described rotary electric machine in its capacity as an electric propulsion or traction motor, energy is drawn from the cells of the battery system whenever the electric powertrain is functioning in a drive or propulsion mode, i.e., when the battery cells are actively discharging. Depending on the particular configuration of the electric machine, the battery cells may be recharged via an offboard charging station and/or via onboard regeneration. Cell data such as individual cell or cell group voltages, charging and discharging electrical currents respectively to and from the battery cells or cell groups, and temperature measurements sampled at various locations within the battery system is collected and closely monitored and controlled over time by a battery control unit. The battery control unit is configured to automatically adjust battery control parameters based on the collected cell data.

A typical battery system arrangement includes a battery pack divided into multiple cell stacks or modules, with each of the battery modules being equipped with an application-suitable number of battery cells and a dedicated cell sense board (CSB). Each respective CSB is configured to measure corresponding cell data for a given battery module, and to communicate the measured cell data to the BSM as part of an ongoing power flow control strategy. The various CSBs are traditionally connected to the BSM in a daisy-chain manner using electrical cables, wiring harnesses, and end connectors in order to provide the requisite communications and electrical connectivity. However, emerging battery systems forego hardwired communications pathways between the BSM and the various CSBs in favor of wireless channels.

SUMMARY

A battery system and an associated control method are disclosed herein that together enable a simplified control architecture for detecting a thermal runaway condition in the battery system. The disclosed strategy uses a variable sampling rate with a battery control network during different battery operating modes. In particular, various controllers of the battery control network are configured to execute different portions of a two-level method to achieve the desired performance improvements.

As part of the present two-level method, a first level of logic, i.e., Level-1 logic, is executed continuously in an embedded battery control module (BCM) in wireless or hardwired communication with multiple embedded cell measurement units (CMUs) during a low-power/OFF operating mode of the battery system. Such a mode typically occurs when the battery system is not actively delivering power to an electrical load or is not being actively monitored. In an exemplary battery electric or hybrid electric vehicle embodiment, for instance, such an OFF mode may be executed whenever the vehicle is parked in an OFF state for an extended duration and the battery system, e.g., a high-energy propulsion battery pack of the vehicle, is not otherwise actively charging or performing another battery function outside of the scope of the present method.

A second level of logic (Level-2 logic) runs during ON mode of the battery system, and is executed by a master controller connected to the embedded battery control module. Level-2 logic and its execution by hardware components of the master controller is selectively triggered by the BCM, possibly using a binary wakeup signal, in response to execution results of the Level-1 logic. The master controller otherwise remains in a low-power/sleep mode during the OFF mode of the battery system until awaked by the BCM in accordance with the method, or until awakened by other systems, e.g., on a CAN bus when the battery system is used aboard a vehicle.

An exemplary embodiment of the battery system includes a multi-cell rechargeable energy storage system (RESS) having a plurality of battery cells arranged in multiple cell groups, and a battery controller network configured to execute two-level logic to detect a thermal runaway condition in the RESS. The battery controller network includes a plurality of CMUs embedded within the RESS, each respective one of the CMUs being electrically connected to a respective one of the cell groups and configured, using a cell sense application-specific integrated circuit and a transceiver, to respectively measure and transmit cell data for the respective cell group.

The network also includes a battery control module (BCM) having a power supply, another transceiver in communication with the plurality of CMUs, and a processor, as well as a plurality of thermal runaway sensors mounted or positioned on the CMUs and/or the BCM. A master controller is used as part of the network. The master controller is connected to the BCM via low-voltage lines and an isolated communications line, and programmed with a predetermined thermal runaway detection algorithm that, when executed by the master controller, is configured to detect a thermal runaway condition occurring within the RESS. The BCM in this embodiment is configured, using cell data from the CMUs and collected data from the thermal runaway sensors, to execute a first logic level (L-1) of the two-level logic to determine when to wake up the master controller and thereafter transmit a wakeup signal thereto. The master controller is configured, in response to receipt of the wakeup signal from the BCM, to execute a second logic level (L-2) of the two-level logic to thereby execute the predetermined thermal runaway detection algorithm.

The isolated communications pathway may be a controller area network (CAN) bus or an isoSPI connection in different embodiments.

A respective one of the thermal runaway sensors may be mounted to or positioned on a respective one of the CMUs, and/or a pair of the thermal runaway sensors may be mounted to or positioned on the BCM.

The RESS in some configurations includes a set of contactors configured to open to thereby disconnect the RESS from an electrical load. The battery system in such an embodiment include a battery disconnect service board (BDSB) connected to the BCM via low-voltage power lines and an isoSPI connection. The BDSB is configured, in response to a predetermined electrical fault, to request opening of the contactors to disconnect the RESS.

The master controller may be configured to command the contactors to open when the predetermined thermal runaway detection algorithm indicates that the thermal runaway condition is active.

The BCM may be configured, as part of the L-1 logic, to detect an undervoltage condition of each of the battery cells of the RESS, and to transmit the wakeup signal to the master controller in response to the undervoltage condition.

Additionally as part of the L-1 logic, the BCM may selectively calculate a maximum temperature difference in cell temperatures of the battery cells over multiple measurement periods, and transmit the wakeup signal to the master controller in response to the maximum temperature difference exceeding a calibrated temperature threshold. The BCM may also compare a difference in data from the thermal runaway sensors to a calibrated fault threshold and thereafter record a fault code when the difference in data from the thermal runaway sensors exceeds a calibrated fault threshold.

The master controller, as part of the L-2 logic, may be configured to enter a low-power sleep mode when the predetermined thermal runaway detection algorithm indicates that the thermal runaway condition is not active, and that a present operating mode of the battery system is not an active operating mode.

The battery system may be used in some embodiments as part of an electric powertrain having a power inverter module connected to the RESS, and a polyphase rotary electric machine connected to the power inverter module.

An electric powertrain is also disclosed herein having, in a possible embodiment, a power inverter module, a polyphase electric motor connected to and energized by the power inverter module, and the RESS and battery controller network summarized above.

The above summary is not intended to represent every embodiment or every aspect of the present disclosure. Rather, the foregoing summary merely provides an exemplification of some of the novel aspects and features set forth herein. The above features and advantages, and other features and advantages of the present disclosure, will be readily apparent from the following detailed description of representative embodiments and modes for carrying out the present disclosure when taken in connection with the accompanying drawings and the appended claims.

Figure 1:
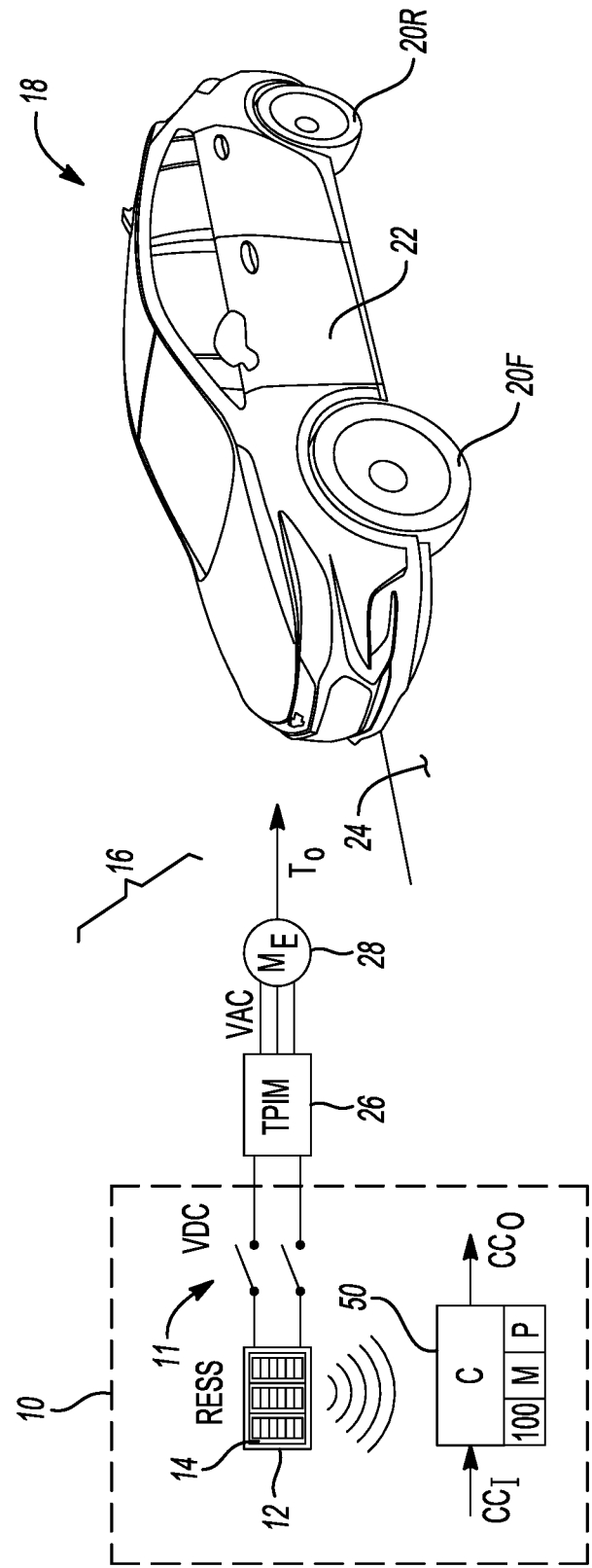
FIG. 1 is a schematic illustration of an electrical system having a battery system and a battery control network configured to implement a two-level method for detecting a thermal runaway condition in the battery system as set forth herein.

The present disclosure is susceptible to various modifications and alternative forms, and some representative embodiments have been shown by way of example in the drawings and will be described in detail herein. Novel aspects of this disclosure are not limited to the particular forms illustrated in the drawings. Rather, the disclosure is intended to cover modifications, equivalents, combinations, or alternatives falling within the spirit and scope of the disclosure as defined by the appended claims.

DETAILED DESCRIPTION

The following detailed description is merely exemplary in nature and is not intended to limit the application and uses. Embodiments of the present disclosure are described herein in terms of functional and/or logical block components and various processing steps. Such block components may be realized by a number of different hardware components each configured to perform the specified functions. In addition, those skilled in the art will appreciate that embodiments of the present disclosure may be practiced to advantage in conjunction with a number of systems, and that the systems described herein are merely exemplary embodiments of the present disclosure.

Referring to the drawings, wherein like reference numerals are used to identify like or identical components in the various views, FIG. 1 schematically depicts a battery system 10 having a multi-cell rechargeable energy storage system (RESS) 12 and a distributed battery controller network (C) 50. The battery system 10 described herein is embodied as multiple embedded control modules that collectively enable data transfer to occur within the battery system 10, either over hardwired connections or wirelessly in different embodiments. The battery controller network 50 is depicted schematically in FIG. 1 as a unitary device solely for illustrative simplicity and descriptive clarity, with exemplary hardware implementation examples depicted in FIGS. 2 and 3 and described below.

Figure 2:
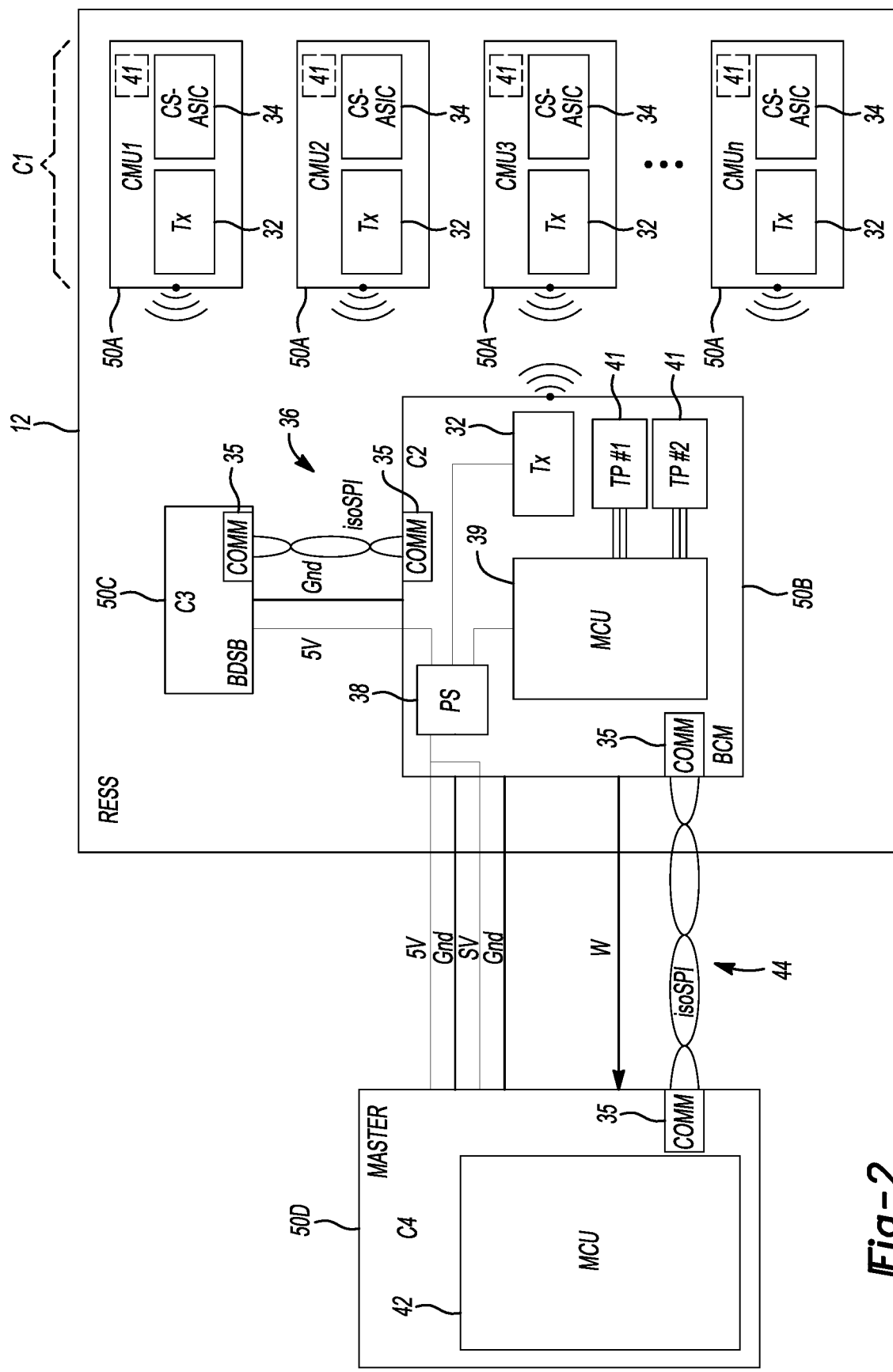
FIGS. 2 and 3 depict exemplary circuit topologies for implementing the present two-level method for thermal runaway detection.
Figure 3:
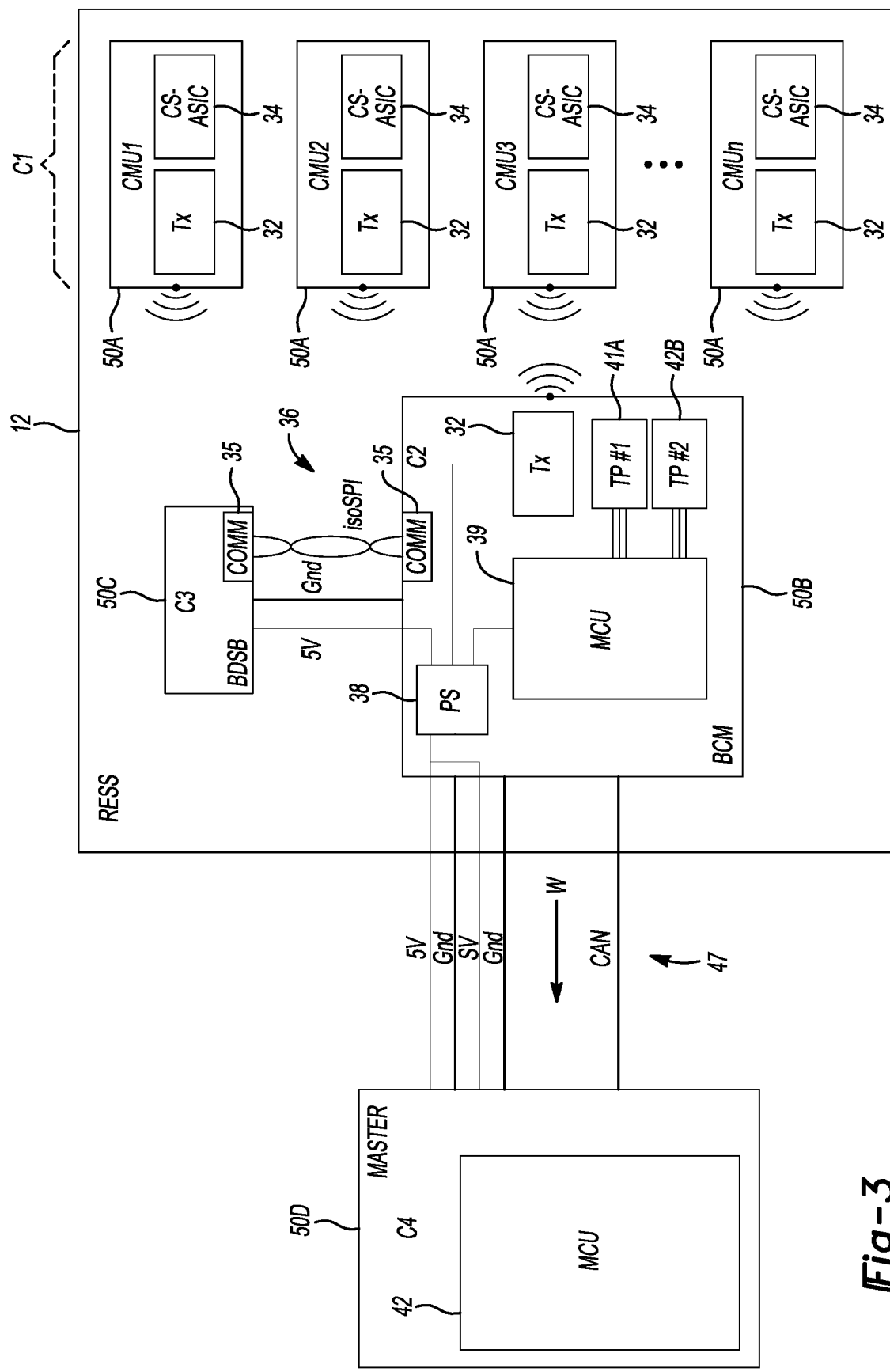

FIG. 1 likewise illustrates memory (M) and a processor (P), with the example implementations of FIGS. 2 and 3 or other hardware implementations not specifically depicted in the Figures possibly including several memory and/or processor devices, locations, and hardware configurations within the scope of the disclosure. Collectively, the various control modules making up the battery controller network 50 are programmed to regulate ongoing thermal and electrical operations of the battery system 10 via a method 100 programmed in the memory (M), with an example of such a method 100 depicted in FIG. 4. The constituent control modules of the battery controller network 50 may selectively execute other software programs lying outside of the scope of method 100, such as but not limited to cell balancing, health monitoring, electric range estimation, and/or powertrain control operations, with such applications being understood in the art and therefore not described herein.

The battery controller network 50 shown in FIG. 1 receives input signals (arrow $CC_I$), and in response thereto transmits output signals (arrow CCo) to change or maintain a present operating state of the battery system 10. The battery controller network 50 is embodied as multiple control modules as noted above, i.e., electronic control units and/or application-specific integrated circuits (ASICs) each having or being able to access the requisite memory (M) and processor (P), as well as other associated hardware and software, e.g., a clock or timer, input/output circuitry, etc. Memory (M) may include sufficient amounts of read only memory, for instance magnetic or optical memory.

The battery controller network 50 includes computer-executable logic or code embodying the method 100, with such logic being configured for detecting a nascent or ongoing thermal runaway condition occurring within the RESS 12. The battery controller network 50 does so using the disclosed two-level logic as executed by specific control modules within the network 50. As will be appreciated by those of ordinary skill in the art, thermal runaway is an undesirable battery thermal condition that may occur in lithium-ion battery cells and cells or cell groups having other battery chemistries, e.g., due to overcharging or cell damage. Thermal runaway occurs when a rate of heat generation within a battery pack, such as the present RESS 12, exceeds a rate at which the generated heat can be effectively dissipated by onboard thermal regulation techniques or power control actions.

In the exemplary battery system 10 of FIG. 1, multiple electrochemical battery cells 14 are arranged or stacked in close proximity to one another. If a given battery cell 14 should happen to experience a rapid increase in temperature, a cascading domino effect could result as the rapidly rising temperature of the battery cell 14 propagates to nearby battery cells 14. Thus, the battery controller network 50 of FIG. 1 is configured to closely monitor the RESS 12 for a thermal runaway condition according to the method 100 of FIG. 4. To facilitate execution of the method 100, the RESS 12 is configured such that onboard cell sensing and cell data communication functions are integrated directly into the structure of the RESS 12, with communication of the cell data possibly performed wirelessly in some embodiments. For example, the RESS 12 may be optionally configured as disclosed in U.S. Pat. No. 10,411,306 to Kim et al., which is hereby incorporated by reference in its entirety.

Further with respect to the battery system 10 shown schematically in FIG. 1, the battery system 10 may be used in a wide range of beneficial applications or systems, including but not limited to road, air, water, or rail vehicles, farm equipment, robots, stationary or mobile powerplants, and other mobile or stationary systems. A possible application of the present battery system 10, and in particular the RESS 12 thereof, is a high-energy direct current (DC) power supply for use in an electric powertrain 16. Such an electric powertrain 16 may be used in some embodiments to propel a motor vehicle 18, e.g., an operator-driven or autonomously-driven passenger or commercial road vehicle. To do so, the electric powertrain 16 may be controlled to generate and deliver output torque (arrow To) to respective front and/or rear road wheels 20F and/or 20R mounted with respect to a body 22 of the motor vehicle 18. Rotation of the road wheels 20F and/or 20R in an electric or hybrid electric drive mode thus propels the motor vehicle 18 along a road surface 24.

In the illustrated exemplary configuration of FIG. 1, the RESS 12 is used as a high-energy/high-voltage power supply aboard the motor vehicle 18. In such an embodiment, the RESS 12 may be selectively disconnected via a set of high-voltage contactors 11 and configured to electrically energize a traction power inverter module (TPIM) 26. Although omitted for illustrative simplicity, those skilled in the art will appreciate that power inverters such as the TPIM 26 contain multiple sets of semiconductor switches and filtering components arranged in phase-specific switching legs, with ON/OFF states of the individual IGBT, MOFSET, or other semiconductor switches changed at a particular rate, e.g., using pulse width modulation. Switching control thus enables the TPIM 26 to receive a DC voltage (VDC) from the RESS 12 and to output a polyphase/AC voltage (VAC). Phase windings of a rotary electric machine (ME) 28 may be electrically connected to the TPIM 26, as noted above, such that the output torque (arrow To) from the electric machine 28 is ultimately delivered to a coupled load, in this instance the road wheels 20F and/or 20R.

As part of the present method 100, which will now be described with reference to the non-limiting example controller architectures of FIGS. 2-4, constituent control modules of the exemplary battery controller network 50 shown in FIG. 1 may be embedded within the battery system 10 and used to determine cell data for each respective battery cell 14 and/or stacks thereof. Such cell data is then reported as part of the input signals (arrow $CC_I$) via a hardwired or a wireless/radio-frequency (RF) transmission, e.g., over a secure RF network at 2.4 GHz or another application-suitable frequency. The embedded control modules used to construct the battery controller network 50 may be positioned a distance apart from each other, e.g., between 0.1 m and 0.5 m apart, and therefore when wireless/RF communications are employed, the particular communications protocols used to implement the present teachings should be selected in close accordance with the distance of such separation, and with due consideration to electromagnetic interference and other potential sources of signal noise.

Referring to FIGS. 2 and 3, the battery controller network 50 depicted schematically in FIG. 1 may be optionally configured as a wireless network having the above-noted embedded control modules, or the depicted wireless pathways may be hardwired using copper wires or other suitable transfer conductors. In particular, the present approach embeds cell sense control modules or cell measurement units (CMUs) 50A within the RESS 12, with the collective set of control modules 50A collectively indicated at C1. For instance, the RESS 12 may be constructed from a plurality (n) of battery cell groups, with each battery cell group having an application-specific number of battery cells 14 and a respective CMU, i.e., CMU1, CMU2, CMU3, . . . , CMUn.

Each CMU 50A is equipped with a respective transceiver (Tx) 32 and a cell sense ASIC (CS-ASIC) 34 in communication therewith. Together, the transceivers 32 and CS-ASIC 34 of a given embedded wireless CMU 50A enable direct cell sensing and wired or wireless communication of sensed cell data to a battery control module (BCM) 50B, labeled C2, which may reside on or in close proximity to the RESS 12. In turn, the BCM 50B is connected to and magnetically isolated from a battery disconnect service board (BDSB) 50C and a master controller 50D, with the BDSB 50C and the master controller 50D respectively labeled C3 and C4 in FIGS. 2 and 3.

The CMUs 50A and the BCM 50B in the depicted topology work in concert when performing the present method 100 during two specific battery operating modes: (1) a "normal" mode when the master controller 50D is awake or when the motor vehicle 18 is in a driving/charging mode, and (2) a low-power "slow" mode in which the master controller 50D is asleep or when the motor vehicle 18 is in an OFF mode. The different battery operating modes during different corresponding modes of the vehicle 18 or other system in which the battery controller network 50 is used can reduce overall energy consumption during ongoing thermal runaway detection efforts which, as will be appreciated, are typically required to be continuously monitored in motor vehicle applications.

As will be explained in the description below with reference to FIG. 4, the present method 100 operates at two logic levels: Level-1 logic, which is executed by the BCM 50B, and Level-2 logic selectively executed by the master controller 50D based on results of the Level-1 logic. The Level-1 logic is based not only on readings from dedicated thermal runaway sensors 41, which may be embedded in the BCM 50B and/or the CMUs 50A in different embodiments, but also using available cell voltage and temperature readings and other wirelessly-reported cell data from the embedded CMUs 50A during a given measurement cycle, i.e., with a common time stamp. Level-1 logic also uses measurements taken from the same battery cell 14 or cell group/location within the RESS 12 during different measurement cycles. Re-using available cell voltage and temperature data from ongoing cell sense activities of the CS-ASICs 34 as a cross-check with data from the dedicated thermal runaway sensors 41 is intended to increase fidelity of Level-1 detection efforts, and can also reduce the number of sensors 41 within the battery system 10.

As noted above, Level-1 basic detection logic resides at the level of the CMUs 50A and the BCM 50B, and is run during OFF modes of the battery system 10. The CMUs 50A and BCM 50B also selectively wake up the master controller 50D whenever an anomaly is detected during Level-1 processing, as explained below with reference to FIG. 4. More sophisticated Level-2 logic resides in the master controller 50D and is executed when the master controller 50D is awake. There, a suitable thermal runaway detection process may be executed based on control parameters, possibly including a reported and/or calculated the state of charge (SOC) and state of health (SOH) of the various battery cells 14 and/or the RESS 12, the present drive/charge/monitoring operating mode, ambient temperature, and possibly other factors.

In a possible embodiment, communication between the CMUs 50A and the BCM 50B may employ a 2.4 GHz wireless protocol over a secure wireless network, such that cell data measured by the individual CMUs 50A is transmitted to the BCM 50B using low-power radio waves. As will be appreciated, the 2.4 GHz protocol generally encompasses a frequency range of about 2.402-2.480 GHz. Other RF frequency ranges may be used within the scope of the present disclosure. Likewise, techniques such as Time Synchronized Channel Hopping (TSCH) may be used, along with the IEEE 802.15.4e Standard for Local and Metropolitan Area Networks or other suitable standards. Exemplary approaches that will be readily appreciated include wireless mote-on-chip, with the CMUs 50A possibly including a multi-channel, multi-cell sensing chip or any other suitably configured CS-ASIC 34 or chip set.

Also depicted in FIGS. 2 and 3 is the BDSB 50C noted above, which along with the BCM 50B may be equipped with its own communications (COMM) chip 35. The BDSB 50C may be programmed with battery-level tasks such monitoring pack voltage, current, and other values for the RESS 12 as a whole. The BDSB 50C may be electrically connected to the battery control module 50B via 5V or other suitable low-voltage power lines and electrical ground (Gnd). To ensure proper isolation between the BCM 50B and the BDSB 50C, the communications chips 35 may be connected via an isolated communications pathway such as isoSPI 36. As will be appreciated by those of ordinary skill in the art, an isoSPI connection may help reject common-mode interference that may be impressed on the wiring extending between the BCM 50B and the BDSB 50C. As part of the programmed functionality of the BDSB 50C, the BDSB 50C may, in response to predetermined conditions and/or detected electrical faults, command or request opening of the contactors 11 of FIG. 1 to thereby disconnect the RESS 12.

Further with respect to the battery control module (BCM) 50B of FIGS. 2 and 3, this device may be configured as a control board that receives wired or wirelessly-communicated/RF data from the various CMUs 50A and, at times, other communicated data from the BDSB 50C. In the illustrated configuration, the BCM 50B includes a power supply (PS) 38, the above-noted communications chip 35, and a transceiver 32. The power supply 38 may be embodied as a small low-voltage lithium-ion battery or other suitable device, which in turn is connected to and powers a master control unit (MCU) 39, e.g., another ASIC or set of processors performing various programmed tasks in the overall management of the battery system 10. Exemplary tasks performed by the BCM 50B and falling within the scope of the disclosure may include performance of basic threshold checks, including cell voltage, temperature, and thermal runaway during execution of the method 100 as explained below. The MCU 39 is also configured to selectively perform a wakeup function in which the MCU 39 selectively transmits a binary wakeup signal (arrow W) to the master controller 50D, thereby triggering an MCU 42 of the master controller 50D to perform its own assigned tasks.

With respect to the master controller 50D, e.g., a vehicle integrated control module or VICM in an exemplary embodiment in which the electric powertrain 16 is used aboard the motor vehicle 18 of FIG. 1, representative tasks of the MCU 42 residing within the master controller 50D may extend beyond the particular tasks disclosed herein. However, when implementing assigned Level-2 logic blocks of the method 100 according to FIG. 4, the MCU 42 may be programmed to at least initiate a thermal runaway detection algorithm, control various mitigation efforts, transmit fault signals where required, and record and/or transmit diagnostic codes indicative of such faults or diagnostic results.

As with the connection between the BDSB 50C and the BCM 50B, the master controller 50D may be connected to the battery control module 50B via an isoSPI connection 44 (see FIG. 2) between respective communications chips 35, and via low-voltage/5V power and ground (Gnd) lines. Alternatively, the connection between the master controller 50D and the BCM 50B may be via a controller area network (CAN) bus 47 as shown in FIG. 3 or another properly isolated connection.

In performing the disclosed two-level thermal runaway detection strategy during operation of the RESS 12, the battery system 10 utilizes the above-noted thermal propagation sensors 41, two of which are respectively abbreviated TP #1 and TP #2. The number and/or location of such sensors 41 may vary with the intended application. For instance, the sensors 41 may reside on the BCM 50B (FIG. 2) or on the individual CMUs 50A (FIG. 3), or in both locations. Thus, added flexibility may be proved by integrating the thermal runway sensors 41 into different locations within the RESS 12.

As will be appreciated by those of ordinary skill in the art, a lithium-ion embodiment of the battery cell 14 shown in FIG. 1 will tend to exhibit a particular set of detectable behavior when undergoing thermal runaway. Thermal runaway may be contained to a single battery cell 14 or may spread to neighboring battery cells 14. Initially, an individual cell voltage of an affected battery cell 14 may decrease due to short-circuited electrodes. Chemical reactions occurring within the battery cell 14 may occur as the anode rapidly heats up, with the heat eventually breaking down protective layers, electrolyte materials, and cell separator materials within the battery cell 14. Exothermic reactions within the battery cell 14 may also generate gasses and increase an interior pressure of the battery cell 14. A ruptured battery cell 14 may likewise vent gasses and possibly particulate matter.

Therefore, the above-described quantities and byproducts of thermal runaway may be detected using the thermal runway sensors 41. While the singular term "sensor" is used herein for each sensor 41 for simplicity, the sensors 41 may each consist of several function-specific sensors, including sensors used in other monitoring systems of the battery system 10, e.g., thermal monitoring or battery cooling systems. Exemplary constituent sensors for use as or as part of the thermal runway sensors 41 include but are not necessarily limited to instance voltage sensors, thermistors, thermocouples, gas detectors, and/or pressure sensors. For illustrative simplicity, the dedicated thermal runaway sensors 41 are shown as single sensor devices in FIGS. 2 and 3 without limiting the disclosure to such an embodiment.

Figure 4:
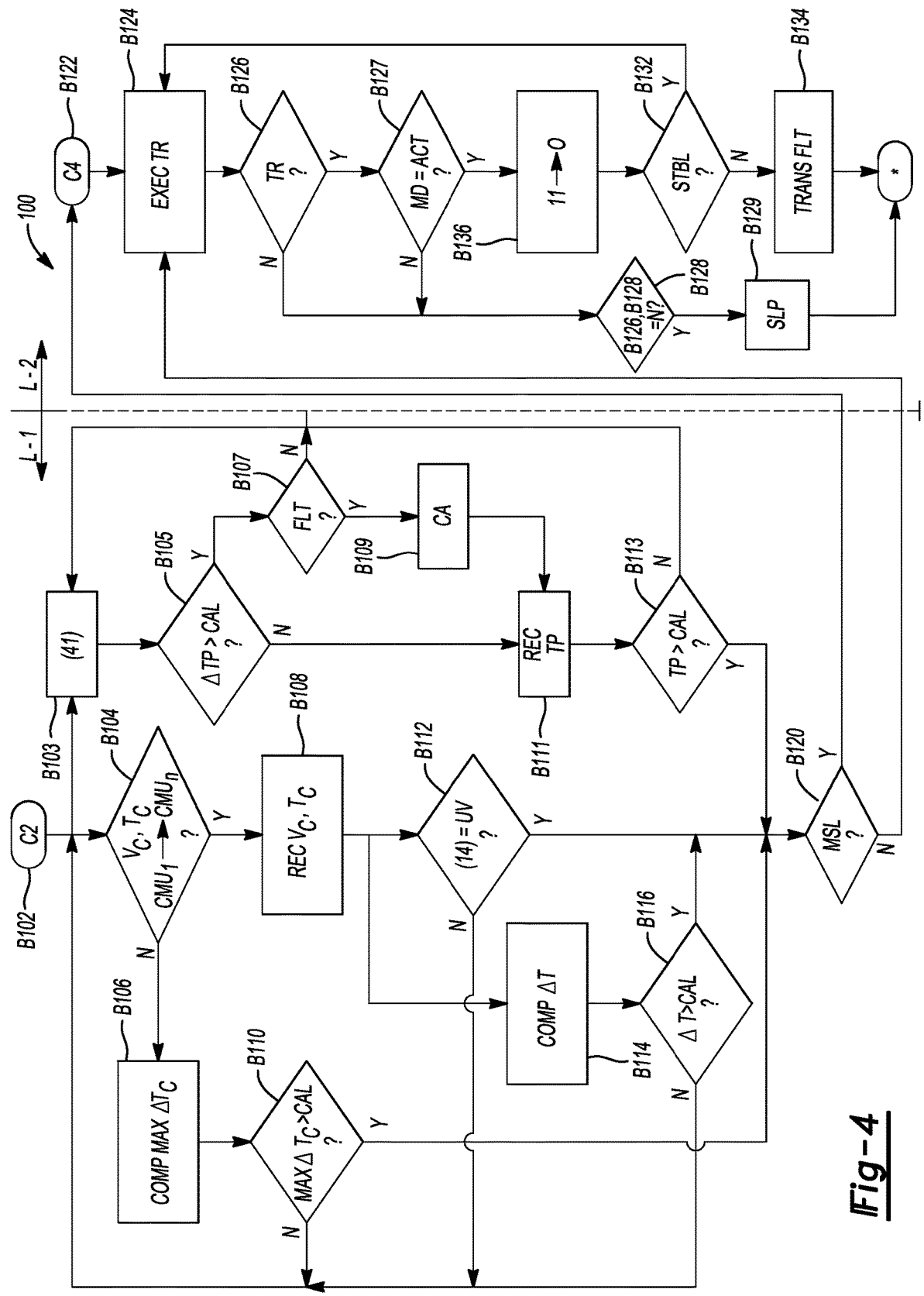
FIG. 4 is a flow chart describing an embodiment of the present method.

Referring to FIG. 4, as mentioned above, the method 100 according to an exemplary embodiment is divided into separate but interrelated Level-1 (L-1) and Level-2 (L-2) logic blocks. The L-1 logic blocks are performed by the battery control module 50B, while the L-2 logic blocks are performed by the master controller 50D.

Level-1 Logic

An embodiment of the present method 100 commences at block B102 with the battery control module (BCM) 50B of FIGS. 2 and 3 entering or operating in an ON state. In operation of the example motor vehicle 18 of FIG. 1 and other systems employing the battery system 10, the BCM 50B remains in the ON state, with the exception of certain operating conditions in which the entire battery system 10 is turned off, e.g., for scheduled maintenance or service of the battery system 10. The method 100 then proceeds to blocks B103 and B104.

At block B103, the thermal runaway sensors 41 measure and output data indicative of one or more of the above-described quantities descriptive of possible thermal runaway or thermal propagation. The sensors 41 may reside in the BCM 50B (FIG. 2) or the CMUs 50A (FIG. 3), as noted above, and therefore block B103 may optionally involve wireless communication of the measured data or simple recordation thereof. The method 100 continues to block B105.

Block B104 includes determining, via the BCM 50B, whether cell data has been received from each of the CMUs 50A (CMU1-CMUn). The cell data may include at least cell voltages (Vc) and temperatures (Tc). The method 100 proceeds to block B108 when the expected cell data has been received from the various CMUs 50A, and to block B106 in the alternative when one or more of the CMUs 50A have not provided expected cell data for a given battery cell 14 or group of such battery cells 14.

Block B105 includes evaluating a difference or "delta" in thermal propagation values measured by the thermal runway sensors 41 to determine if one of the sensors 41 is not functioning properly or is not outputting data. The method 100 proceeds to block B107 when the delta value exceeds the calibrated fault threshold (ΔTP>CAL), and otherwise proceeds to block B111 when the delta value falls within acceptable limits.

At block B106, the method 100 includes comparing a maximum cell temperature difference between received individual cell temperature readings from multiple temperature sensors of the CS-ASICs 34 for a given measurement cycle (COMP MAX ΔTc), and then proceeds to block B110.

At block B107, the battery control module 50B determines if the data from block B105 is indicative of a fault in which one of the thermal runaway sensors 41 being offline or not communicating data (FLT?), such as by comparing the data to an expected value. If this is the case, the method 100 proceeds to block B108. Otherwise, the method 100 repeats block B103.

Block B108 includes recording the cell voltage and temperature measurements (REC Vc, Tc) from one measurement cycle before proceeding to blocks B112 and B114.

At block B109, the battery control module 50B executes a control action (CA) in response to the sensor fault determination made at block B107. For example, battery control module 50B may set a diagnostic code indicative of a faulty thermal runaway sensor 41 before proceeding to block B111.

At block B110 of the method 100, the maximum cell temperature difference from block B106 is compared to a calibrated temperature threshold (MAX ΔTc>CAL). Block B104 is repeated when the maximum cell temperature difference does not exceed the calibrated temperature threshold. The method 100 instead proceeds to block B120 when the maximum cell temperature difference exceeds the calibrated temperature threshold.

Block B111 entails recording the thermal propagation sensor data (REC STP) from the particular thermal runaway sensor 41 that is functioning properly, as determined by the battery control module 50B in blocks B105 and B107. The method 100 then proceeds to block B113.

Block B112 includes determining, via the battery control module 50B based on the cell data from block B106, whether an under-voltage condition is present on any given one of the battery cells 14 (14=UV?). For example, block B112 may be implemented by comparing the cell voltages to a calibrated voltage threshold. The method 100 proceeds to block B120 when such an under-voltage condition is detected, with the method 100 otherwise repeating block B104 when such an undervoltage condition is not present.

At block B113, the BCM 50B next determines whether data from the thermal runaway sensor(s) 41 exceeds a calibrated threshold (TP>CAL). Exemplary data suitable for diagnosing a thermal runaway condition is disclosed above and appreciated in the art, including but not necessarily limited to voltage, pressure, temperature, and/or the presence of a particular gas that might be generated during thermal runaway. The method 100 then proceeds to block B120.

Block B114 includes comparing a temperature difference, between a current and previous measurement cycle, for each reported cell temperature of the RESS 12 (COMP ΔTc). The method 100 then proceeds to block B116.

Block B116 includes determining whether the delta value taken from block B114 exceeds a calibrated cell temperature threshold (ΔTc>CAL). If so, the method 100 proceeds to block 120. The method 100 otherwise repeats block B104.

Block B120 of the method 100 depicted in FIG. 4 entails determining whether the battery system 10 is in a predetermined slow mode. As used herein and in the art, slow mode refers to a low-power mode that is executed whenever the motor vehicle 18 of FIG. 1 or another system using the battery system 10 is in an OFF state. The method 100 proceeds to block B122 when the master controller 50D is in such a slow mode, and to block B124 in the alternative when the master controller 50D is not presently in slow mode. Block B120 thus is the final step performed in the L-1 portion of the method 100.

Level-2 Logic

Block B122 includes using the BCM 50B to wake up or start the master controller 50D (C4), e.g., via transmission of the binary wakeup signal (arrow W) shown in FIGS. 2 and 3. The method 100 then proceeds to block B124.

Block B124 entails executing a thermal propagation or runaway algorithm (EXEC TR) using cell data received from the various measurements performed by the CMUs 50A and wirelessly communicated to the BCM 50B in Level-1 of method 100. Various approaches exist for monitoring lithium-ion batteries and other high-energy battery packs for possible thermal runaway conditions, with the present disclosure not limited to a particular approach. For example, instantaneous voltage and temperature readings from block B103 from the various CS-ASICs 34 of the CMUs 50A, readings from the thermal runaway sensors 41 of the CMUs 50A and/or the battery control module 50B, and trends in such data over progressive measurement intervals may be used to detect a threshold rate of temperature increase in the RESS 12. The method 100 proceeds to block B126 once the thermal runaway algorithm has been executed.

At block B126, the method 100 includes determining, based on the results of block B124, whether a thermal runaway condition is presently active (TR?). The method 100 proceeds to block B127 when a thermal runaway condition is detected, and to block B128 in the alternative when block thermal runaway conditions are not detected.

Block B127 includes determining whether the present operating mode of the battery system 10 is an active mode (MD=ACT?), which in the embodiment of the motor vehicle 18 of FIG. 1 may be a drive mode, a battery charging mode, or a battery monitoring mode. The method 100 proceeds to block B128 when none of these modes are active, and to block B136 in the alternative.

At block B128, the master controller 50D next determines whether the results of blocks B126 and B128 were both negative, i.e., that there is no detected thermal runaway (block B126) and that the present drive mode is not a drive, charging, or active monitoring mode (block B127). The method 100 proceeds from block B128 to block B129 when the results of blocks B126 and B128 are negative, and to block B136 when one of the blocks B126 or B128 has a positive result.

Block B129 includes returning the master controller 50D to a low-power sleep mode. As part of block B129, the master controller 50D may self-initiate a return to the sleep mode. The method 100 is then complete (*) when the master controller 50D enters the sleep mode, resuming anew with block B102.

At block B136, the master controller 50D commands the contactors 11 of FIG. 1 to open (11→O) to thereby disconnect the RESS 12 from the rest of the electrical system, e.g., the remaining components of the electric powertrain 16 shown in FIG. 1. The method 100 then returns to block B132.

At block B132, the master controller 50D may determine, with the contactors 11 now open and after a calibrated delay, whether the thermal runaway condition detected at block B126 has stabilized to within an allowable tolerance. If so, the method 100 repeats block B124. The method 100 otherwise proceeds to block B134 when the thermal runaway condition has not stabilized.

Block B134 includes transmitting a fault signal (TRANS FLT) and/or triggering a suitable alarm, e.g., an audio and/or visual alert, message, or other suitable control action. The method 100 is thereafter complete (*).

In view of the foregoing description, those of ordinary skill in the art will recognize a number of possible benefits and advantages of the present two-level logic and architecture for performing a thermal runaway detection analysis. For example, the simplified hardware architecture shown in the representative examples of FIGS. 2 and 3 enable the reuse of battery data already measured during ongoing cell sense operations of the CMUs 52A. Such reuse may help reduce 12V power consumption for such a purpose, particularly when the method 100 is employed aboard the motor vehicle 18 of FIG. 1. The present approach enables continuous monitoring and basic rationality checks to be run at Level-1, i.e., within the BCM 50B, which is typically in an ON state, with a reduced number of dedicated thermal runaway sensors 41 needed for performing requisite thermal runaway measurements. Additionally, the present method 100 enables real-time prognosis of thermal runaway conditions without requiring the ongoing involvement of the master controller 50D.

Also enabled by the present teachings is the added flexibility provided by integrating the thermal runaway sensors 41 into the CMUs 50A and/or the BCM 50B. Availability of the particular system in which the battery system 10 is employed, such as the motor vehicle 18 of FIG. 1, may be increased by reducing wakeup time needed for the master controller 50D, and by reducing 12V power consumption as noted above. Moreover, the present approach allows CMUs 50A and the BCM 50B to be updated using configurable thresholds calculated by the master controller 50D, e.g., based on machine learning, to thereby improve detection sensitivity, robustness, and improve customer satisfaction.

While the best modes for carrying out the disclosure have been described in detail, those familiar with the art to which this disclosure relates will recognize various alternative designs and embodiments lying within the scope of the appended claims. It is intended that all matter contained in the above description and/or shown in the accompanying drawings shall be interpreted as illustrative only and not as limiting.

What we claim is:

1. A battery system comprising:
   a multi-cell rechargeable energy storage system (RESS) having a plurality of battery cells arranged in multiple cell groups which form a high-voltage battery chain;
   wherein the RESS includes a set of contactors configured to open to thereby disconnect the RESS from an electrical load; and
   a battery controller network configured to execute two-level logic to detect a thermal runaway condition in the RESS, the battery controller network including:
   a plurality of cell monitoring units (CMUs) embedded within the RESS, each respective one of the CMUs being electrically connected to a respective one of the cell groups and configured, using a cell sense application-specific integrated circuit and a transceiver, to respectively measure and transmit cell data for the respective cell group;

a battery control module (BCM) having another transceiver in communication with the plurality of CMUs;

a plurality of thermal runaway sensors mounted to or positioned on the CMUs and/or the BCM; and a master controller connected to the BCM via low-voltage lines and an isolated communications pathway, in which the high-voltage battery chain is separate from the low-voltage lines such that the high-voltage battery chain remains isolated from the low-voltage lines, and the master controller is programmed with a predetermined thermal runaway detection algorithm that, when executed by the master controller, is configured to detect the thermal runaway condition occurring within the RESS;

wherein the master controller is configured to command the contactors to open when the predetermined thermal runaway detection algorithm indicates that the thermal runaway condition is active;

wherein the BCM is configured, using the cell data from the CMUs and collected data from the thermal runaway sensors, to execute a first logic level (L-1 logic) of the two-level logic to determine when to wake up the master controller and thereafter transmit a wakeup signal thereto; and wherein the master controller is configured, in response to receipt of the wakeup signal from the BCM, to execute a second logic level (L-2 logic) of the two-level logic to thereby execute the predetermined thermal runaway detection algorithm.

2. The battery system of claim 1, wherein the isolated communications pathway is a controller area network (CAN) bus.

3. The battery system of claim 1, wherein the isolated communications pathway is an isoSPI connection.

4. The battery system of claim 1, wherein the plurality of thermal runaway sensors includes a respective one of the thermal runaway sensors mounted to or positioned on a respective one of the CMUs.

5. The battery system of claim 1, wherein the plurality of thermal runaway sensors includes a pair of the thermal runaway sensors mounted to or positioned on the BCM.

6. The battery system of claim 1, wherein the battery system further comprising:

a battery disconnect service board (BDSB) connected to the BCM via low-voltage power lines and an isoSPI connection, wherein the BDSB is configured, in response to a predetermined electrical fault, to request opening of the contactors to disconnect the RESS.

7. The battery system of claim 1, wherein the BCM is configured, as part of the L-1 logic, to detect an undervoltage condition of each of the battery cells of the RESS, and to transmit the wakeup signal to the master controller in response to the undervoltage condition.

8. The battery system of claim 1, wherein the BCM is configured, as part of the L-1 logic, to selectively calculate a maximum temperature difference in cell temperatures of the battery cells over multiple measurement periods, and to transmit the wakeup signal to the master controller in response to the maximum temperature difference exceeding a calibrated temperature threshold.

9. The battery system of claim 1, wherein the BCM is configured, as part of the L-1 logic, to compare a difference in data from the thermal runaway sensors to a calibrated fault threshold, and to record a fault code when the difference in data from the thermal runaway sensors exceeds the calibrated fault threshold.

10. The battery system of claim 1, wherein the master controller, as part of the L-2 logic, is configured to enter a low-power sleep mode when the predetermined thermal runaway detection algorithm indicates that the thermal runaway condition is not active, and that a present operating mode of the battery system is not an active operating mode.

11. The battery system of claim 1, wherein the battery system is part of an electric powertrain having a power inverter module connected to the RESS, and a polyphase rotary electric machine connected to the power inverter module.

12. An electric powertrain comprising:

a power inverter module;

a polyphase electric motor connected to and energized by the power inverter module;

a multi-cell rechargeable energy storage system (RESS) connected to the power inverter module via a pair of contactors, and having a plurality of battery cells arranged in multiple cell groups which form a high-voltage battery chain; and a battery controller network disposed outside of the power inverter module, wherein the battery controller network is configured to execute two-level logic to detect a thermal runaway condition in the RESS, the battery controller network including:

a plurality of cell monitoring units (CMUs) embedded within the RESS, each respective one of the CMUs being electrically connected to a respective one of the cell groups and configured, using a cell sense application-specific integrated circuit and a transceiver, to respectively measure and transmit cell data for the respective cell group;

a battery control module (BCM) having another transceiver in communication with the plurality of CMUs;

a plurality of thermal runaway sensors mounted to or positioned on the CMUs and/or the BCM;

a battery disconnect service board (BDSB) connected to the BCM via additional low-voltage power lines and an isoSPI connection, wherein the BDSB is configured, in response to a predetermined electrical fault, to request disconnection of the RESS via operation of the contactors; and a master controller connected to the BCM and the BDSB via low-voltage lines and either a controller area network (CAN) bus or another isoSPI connection, in which the high-voltage battery chain is separate from the low-voltage lines such that the high-voltage battery chain remains isolated from the low-voltage lines, and the master controller is programmed with a predetermined thermal runaway detection algorithm that, when executed by the master controller, is configured to detect the thermal runaway condition occurring within the RESS;

wherein the BCM is configured, using the cell data from the CMUs and collected data from the thermal runaway sensors, to execute a first logic level (L-1 logic) of the two-level logic to determine when to wake up the master controller and thereafter transmit a wakeup signal thereto; and wherein the master controller is configured, in response to receipt of the wakeup signal from the BCM, to execute a second logic level (L-2 logic) of the two-level logic to thereby execute the predetermined thermal runaway detection algorithm, and to open the contactors when the predetermined thermal runaway detection algorithm indicates that the thermal runaway condition is active.

13. The electric powertrain of claim 12, wherein the BCM is configured, as part of the L-1 logic, to detect an undervoltage condition of each of the battery cells of the RESS, and to transmit the wakeup signal to the master controller in response to the undervoltage condition.

14. The electric powertrain of claim 13, wherein the BCM is further configured, as part of the L-1 logic, to selectively calculate a maximum temperature difference in cell temperatures of the battery cells over multiple measurement periods, and to transmit the wakeup signal to the master controller in response to the maximum temperature difference exceeding a calibrated temperature threshold.

15. The electric powertrain of claim 14, wherein the BCM is further configured, as part of the L-1 logic, to compare a difference in data from the thermal runaway sensors to a calibrated fault threshold, and to record a fault code when the difference in data from the thermal runaway sensors exceeds the calibrated fault threshold.

16. The electric powertrain of claim 15, wherein the master controller, as part of the L-2 logic, is further configured to enter a low-power sleep mode when the predetermined thermal runaway detection algorithm indicates that the thermal runaway condition is not active, and that a present operating mode of a battery system is not an active operating mode.

17. The electric powertrain of claim 12, wherein the polyphase electric motor is a high-energy electric traction motor configured to connect to one or more road wheels of a motor vehicle.

18. A battery controller network for use with a multi-cell rechargeable energy storage system (RESS), the battery controller network being configured to execute two-level logic to detect a thermal runaway condition of the RESS, the battery controller network including:
   a plurality of cell monitoring units (CMUs) embedded within the RESS, each respective one of the CMUs being electrically connected to a respective one of a plurality of cell groups, wherein the cell groups form a high-voltage battery chain, and each of the respective CMUs is configured, using a cell sense application-specific integrated circuit and a transceiver, to respectively measure and wirelessly transmit cell data for the respective cell group;
   a battery control module (BCM) having a power supply, another transceiver in communication with the plurality of CMUs, and a processor;
   a plurality of thermal runaway sensors mounted or positioned on the CMUs and/or the BCM;
   a battery disconnect service board (BDSB) connected to the BCM via low-voltage power lines and an isoSPI connection, wherein the BDSB is configured, in response to a predetermined electrical fault, to transmit a request for disconnection of the RESS; and
   a master controller connected to the BCM and the BDSB via low-voltage lines and an isolated communications pathway, in which the high-voltage battery chain is separate from the low-voltage lines such that the high-voltage battery chain remains isolated from the low-voltage lines, wherein the isolated communications pathway is a controller area network (CAN) bus or another isoSPI connection, and the master controller is programmed with a predetermined thermal runaway detection algorithm that, when executed by the master controller, is configured to detect the thermal runaway condition occurring within the RESS;
   wherein the BCM is configured, using the cell data from the CMUs and collected data from the thermal runaway sensors, to execute a first logic level (L-1 logic) of the two-level logic to determine when to wake up the master controller and thereafter transmit a wakeup signal thereto; and
   wherein the master controller is configured, in response to receipt of the wakeup signal from the BCM, to execute a second logic level (L-2 logic) of the two-level logic to thereby execute the predetermined thermal runaway detection algorithm.

19. The battery controller network of claim 18, wherein the BCM is configured, as part of the L-1 logic, to:
   selectively calculate a maximum temperature difference in cell temperatures of multiple battery cells of the RESS over multiple measurement periods, and to transmit the wakeup signal to the master controller in response to the maximum temperature difference exceeding a calibrated temperature threshold;
   compare a difference in data from the thermal runaway sensors to a calibrated fault threshold, and to record a fault code when the difference in data from the thermal runaway sensors exceeds the calibrated fault threshold; and
   enter a low-power sleep mode when the predetermined thermal runaway detection algorithm indicates that the thermal runaway condition is not active, and that a present operating mode of a battery system is not an active operating mode.

* * * * *